(12) United States Patent
Pimpinella et al.

(10) Patent No.: US 11,644,623 B2
(45) Date of Patent: May 9, 2023

(54) DUPLEX MOST CONNECTOR

(71) Applicant: Panduit Corp., Tinley Park, IL (US)

(72) Inventors: Richard J. Pimpinella, Frankfort, IL (US); Andrew R. Matcha, Chicago, IL (US); Surendra Chitti Babu, Naperville, IL (US); Royal O. Jenner, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 1 day.

(21) Appl. No.: 17/365,466

(22) Filed: Jul. 1, 2021

(65) Prior Publication Data

US 2023/0003942 A1 Jan. 5, 2023

(51) Int. Cl.
*G02B 6/26* (2006.01)

(52) U.S. Cl.
CPC .................... *G02B 6/262* (2013.01)

(58) Field of Classification Search
CPC ...................................... G02B 6/262
USPC ................... 385/33–35, 53, 61, 74
See application file for complete search history.

(56) References Cited

U.S. PATENT DOCUMENTS

| 4,585,193 | A | * | 4/1986 | Rossberg | G02B 6/264 |
| | | | | | 248/65 |
| 9,588,302 | B2 | | 3/2017 | Grinderslev | |
| 9,645,325 | B2 | | 5/2017 | Fortusini et al. | |
| 9,746,620 | B2 | | 8/2017 | Zhang et al. | |
| 9,977,194 | B2 | | 5/2018 | Waldron et al. | |
| 10,534,141 | B2 | | 1/2020 | Nielson et al. | |
| 2004/0005111 | A1 | * | 1/2004 | Ishikawa | G02B 6/3582 |
| | | | | | 385/16 |
| 2021/0199897 | A1 | * | 7/2021 | Pimpinella | G02B 6/32 |

* cited by examiner

*Primary Examiner* — Michael P Mooney
(74) *Attorney, Agent, or Firm* — Christopher S. Clancy; James H. Williams; Christopher K. Marlow

(57) ABSTRACT

An optical fiber connector has a lens component and a fiber component. The lens component has at least one lens and an opening with at least one V-groove therein. The at least one lens is associated with the at least one V-groove. The fiber component is configured to be partially inserted into the lens component and has at least one bare fiber flexible retention feature configured to retain a fiber of a fiber optic cable within the at least one V-groove and also to align the fiber with the lens.

3 Claims, 11 Drawing Sheets

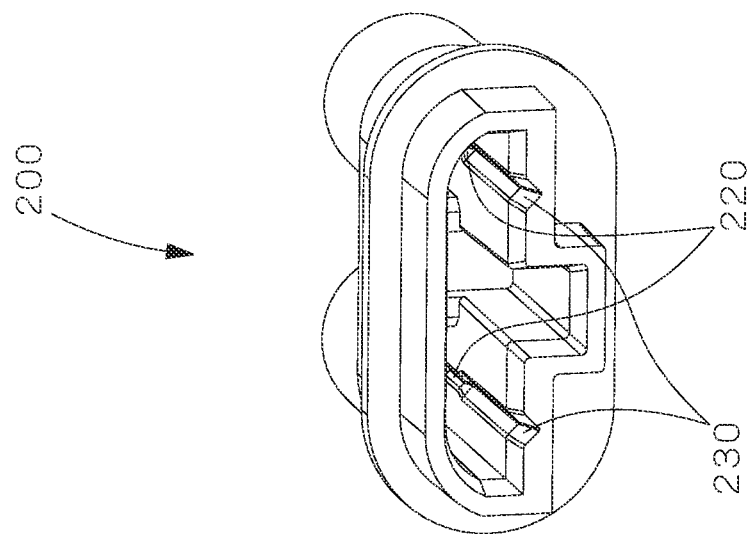
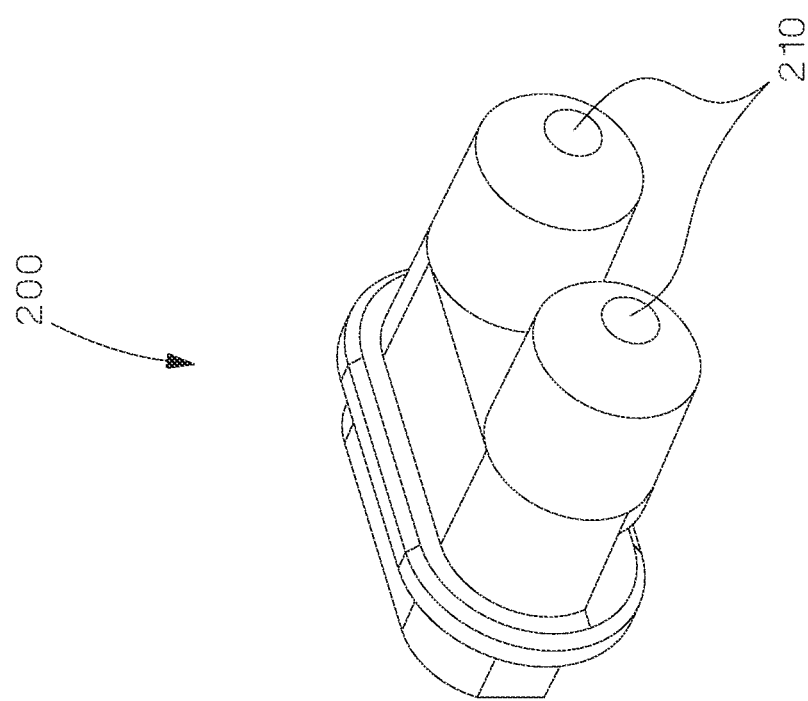
FIG. 3

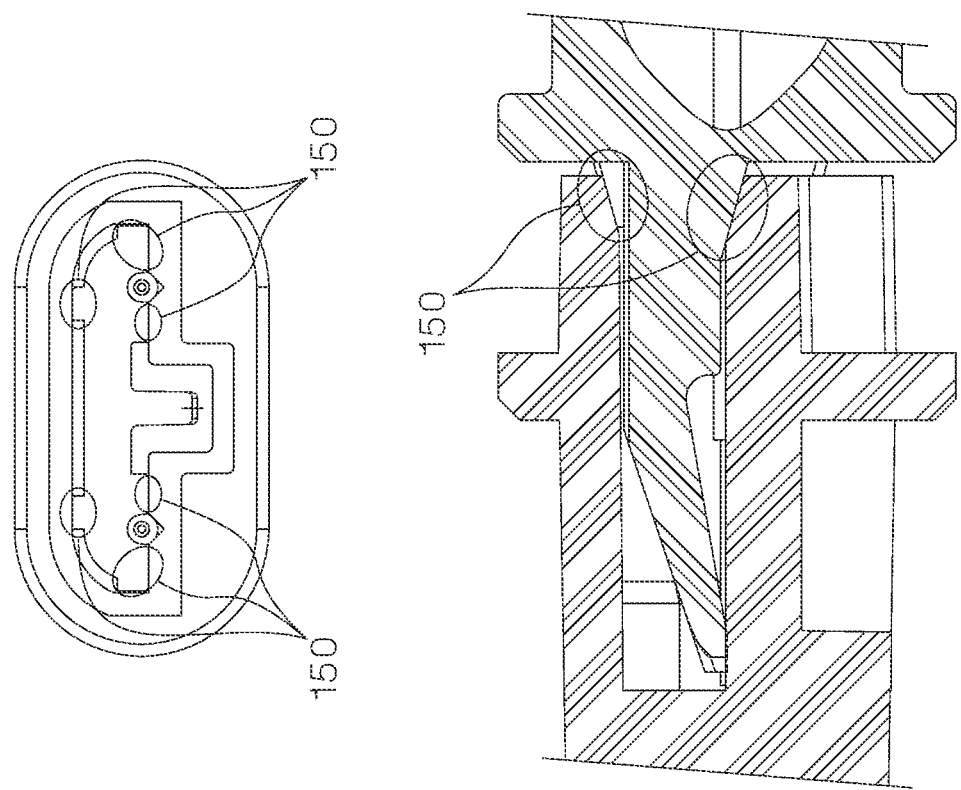
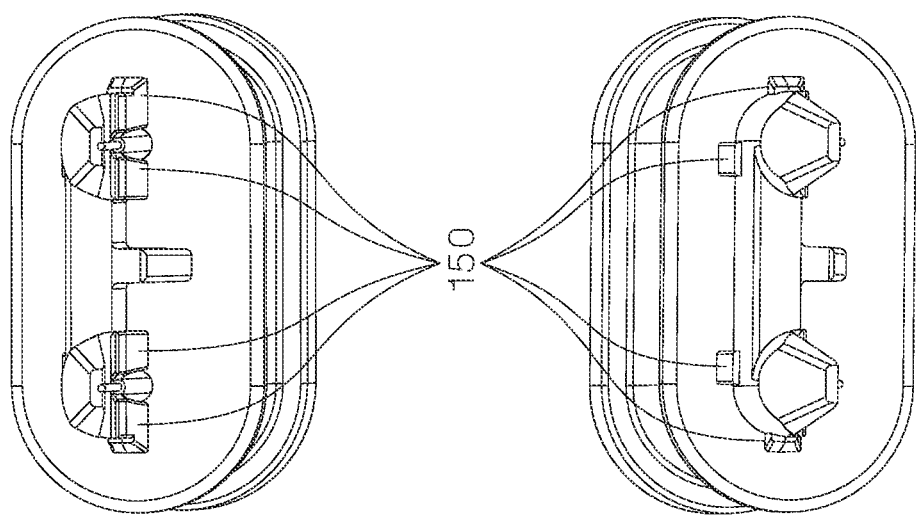
FIG.5

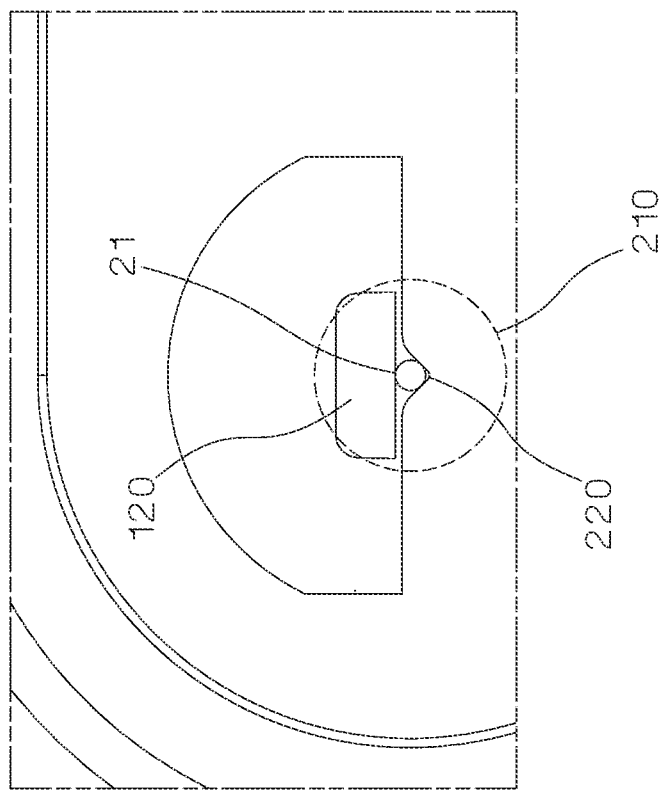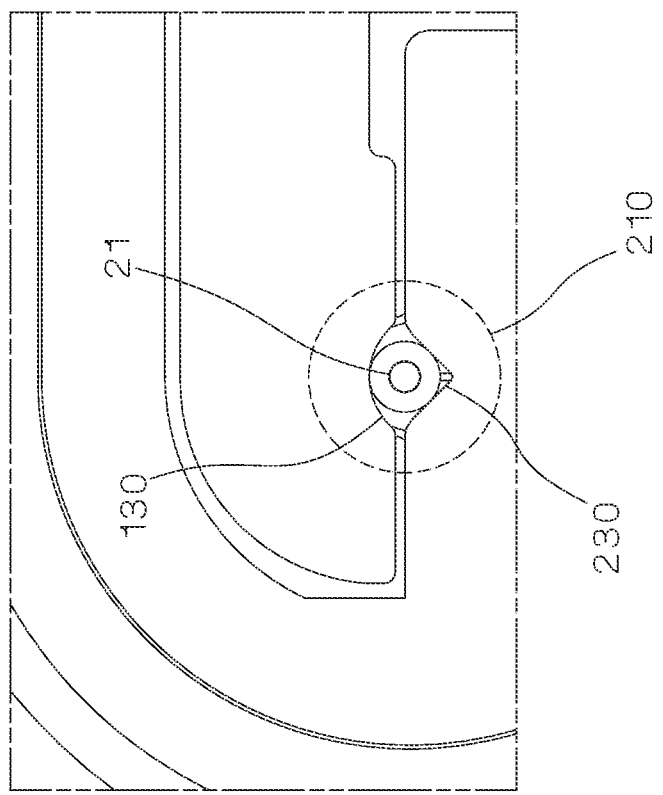
FIG.9

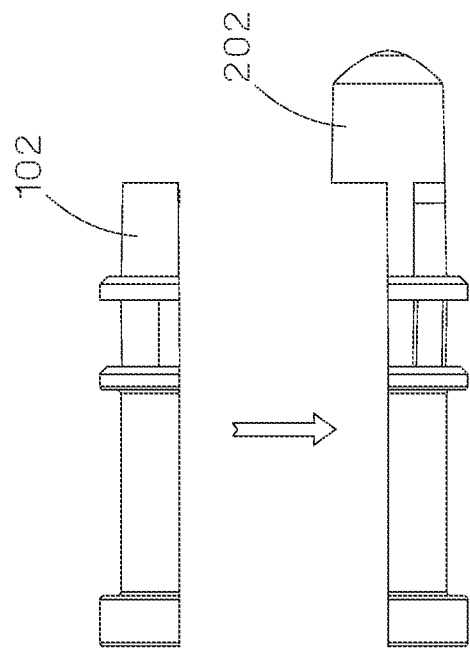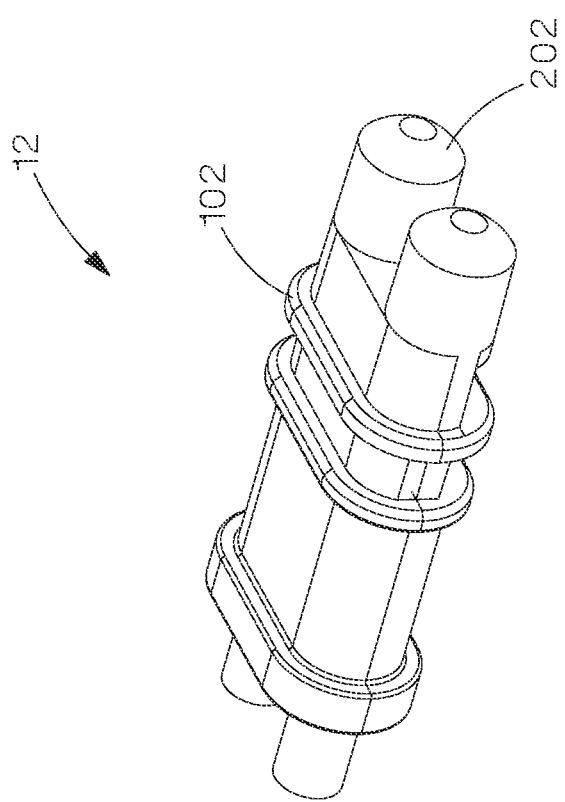
FIG.11

DUPLEX MOST CONNECTOR

FIELD OF THE INVENTION

The present invention relates generally to the field of optical fiber connectors and more specifically to duplex expanded beam optical connector assembly for automotive applications.

BACKGROUND

The data communications technology used in the automotive industry worldwide is the Media Oriented Systems Transport (MOST) technology, which defines the physical and data link layers specified in the International Organization for Standardization (ISO) Open Systems Interface (OSI) model. The MOST technology was specified by a cooperation founded in 1998, which was a partnership of carmakers, setmakers, system architects, and key component suppliers. Their objective was to define and adopt a common multimedia network protocol and application object model. As a result of their efforts, MOST technology has emerged as a global standard for implementing current requirements for multimedia networking in automobiles.

The MOST150 interface introduced in October 2007 provides a physical layer to implement Ethernet in automobiles as the transport for audio, video, voice, and data signals via plastic optical fiber (POF). More recently (2014), the IEEE 802.3bv Ethernet Task Force specified a physical layer for 1 Gbps over 1 mm step-index POF for distances up to 50 meters. POF provides several advantages over highbandwidth Graded-Index multimode fiber (GI-MMF) due to its large core diameter of 0.98 mm compared to 0.05 mm for standard glass graded-index multimode fiber types. The large core diameter eliminates the need for high-precision optical connectors and no polishing is required. These attributes make the connector very low cost. However, large core optical fiber types (>0.05 mm) support a large number of guided fiber modes and consequently, the fiber exhibits high modal dispersion and low bandwidth, making them only useful for low date rates ≤1 Gb/s and short reaches ≤50 meters.

As more video services and sensors are integrated into the vehicular network higher data rates up to 25 Gbps are required. For data rates exceeding 1 Gbps, graded-index multimode fiber, such as Types OM1, OM2, OM3, and OM4, or small core graded-index plastic optical fiber is required. The smaller core diameters of the graded-index fibers reduce the number of fiber modes and the graded index of refraction equalizes the mode group delays thereby reducing the modal dispersion penalty. Fiber types OM1 and OM2, are no longer recommended by industry Standards and are considered obsolete and therefore, for automotive applications OM3 is the optimum choice for glass MMF. Higher bandwidth OM4 demands a price premium and is for long reach applications greater than 100 meters, which far exceeds the requirements for automotive applications. GI-POF can also be a good alternative.

Optical connectors used for GI-MMF, such as the LC and SC, and the newer SN and MDC connectors, are ultra-high precision, low insertion loss, physical contact connectors and consequently, not ideal for dirty harsh environments and are prohibitively expensive for automotive applications. These connector types are designed primarily for use in controlled environments over a much reduced application temperature range, and are easily contaminated making them unsuitable for dirty automotive applications.

Hence, for next generation higher-speed automotive optical transport data rates >1 Gbps, it is desirable to have a low cost optical fiber connector that supports small core diameter (typically 50 mircons) high-bandwidth graded-index multimode fiber, in harsh conditions and over a wide temperature range.

SUMMARY

An optical fiber connector has a lens component and a fiber component. The lens component has at least one lens and an opening with at least one V-groove therein. The at least one lens is associated with the at least one V-groove. The fiber component is configured to be partially inserted into the lens component and has at least one bare fiber flexible retention feature configured to retain a fiber of a fiber optic cable within the at least one V-groove and also to align the fiber with the lens.

BRIEF DESCRIPTION OF THE DRAWINGS

FIG. 3 is isometric views of the lens side component of the MOST optical fiber connector of FIG. 1.

FIG. 5. Shows locations for bonding the fiber side component to the lens side component.

FIG. 9 is cross-sectional views showing the large V-groove (left) and small V-groove (right) of the lens side component.

FIG. 11 shows an alternate embodiment of a MOST optical fiber connector.

DETAILED DESCRIPTION OF THE INVENTION

Figure 1:
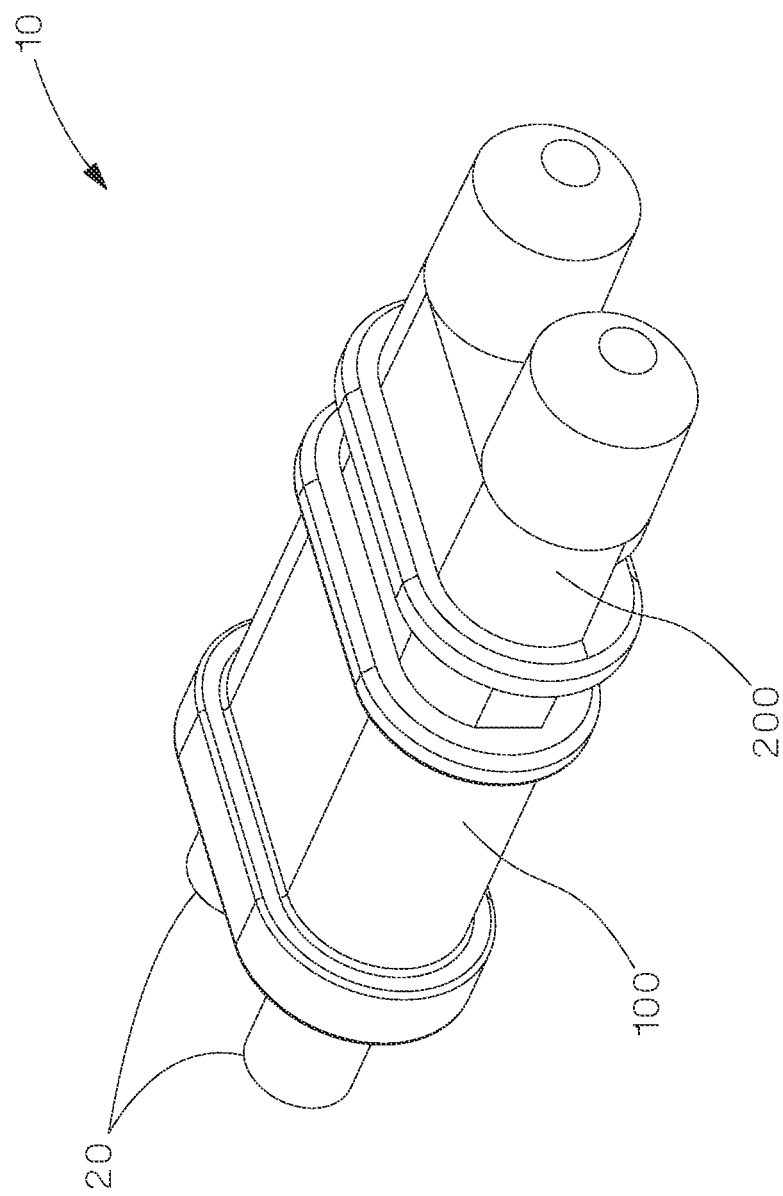
FIG. 1. is an isometric view of one embodiment of a duplex MOST optical fiber connector according to the present invention.

As shown in FIGS. 1 and 11, the MOST optical fiber connectors described herein feature a duplex form factor rather than a simplex form factor, meaning that the current design can support two fiberoptic cables rather than just one. In order to retain familiarity with current automobile workers and mechanics who have been handling MOST optical fiber connectors for years, the overall fit and form have been kept as similar as possible to the original design when developing the duplex design.

As shown in FIG. 1, a duplex MOST optical fiber connector 10 can be made up of two components: the fiber side component 100 and the lens side component 200. Both components are manufactured separately, assembled, and then bonded to form one complete connector as shown in FIG. 1. Bonding of the two connector components can be done utilizing various techniques such as laser welding, high frequency welding and/or ultrasonic welding. Epoxies may also be used to bond the two connector components.

Figure 2:
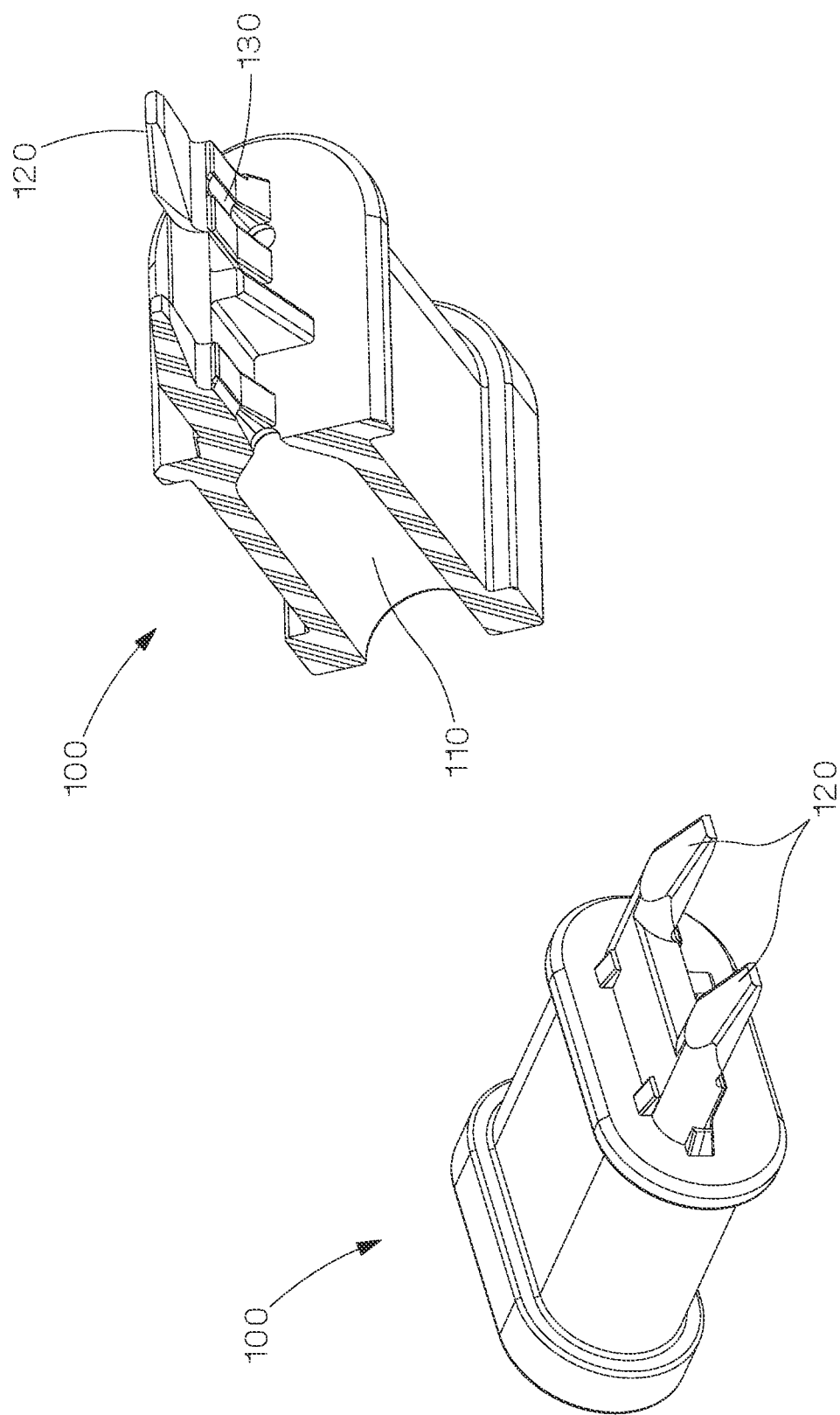
FIG. 2 is isometric views of the fiber side component of the MOST optical fiber connector of FIG. 1.

FIG. 2. shows standalone images of the fiber side component 100 of the MOST optical fiber connector 10 connector along with some of its features including a fiberoptic cable retention pocket 110, bare fiber flexible retention features 120, and fiber guide channels 130.

FIG. 3. shows standalone images of the lens side component 200 of the MOST optical fiber connector 10 connector along with some of its features including optical lenses 210 and small 220 and large V-grooves 230.

Figure 4:
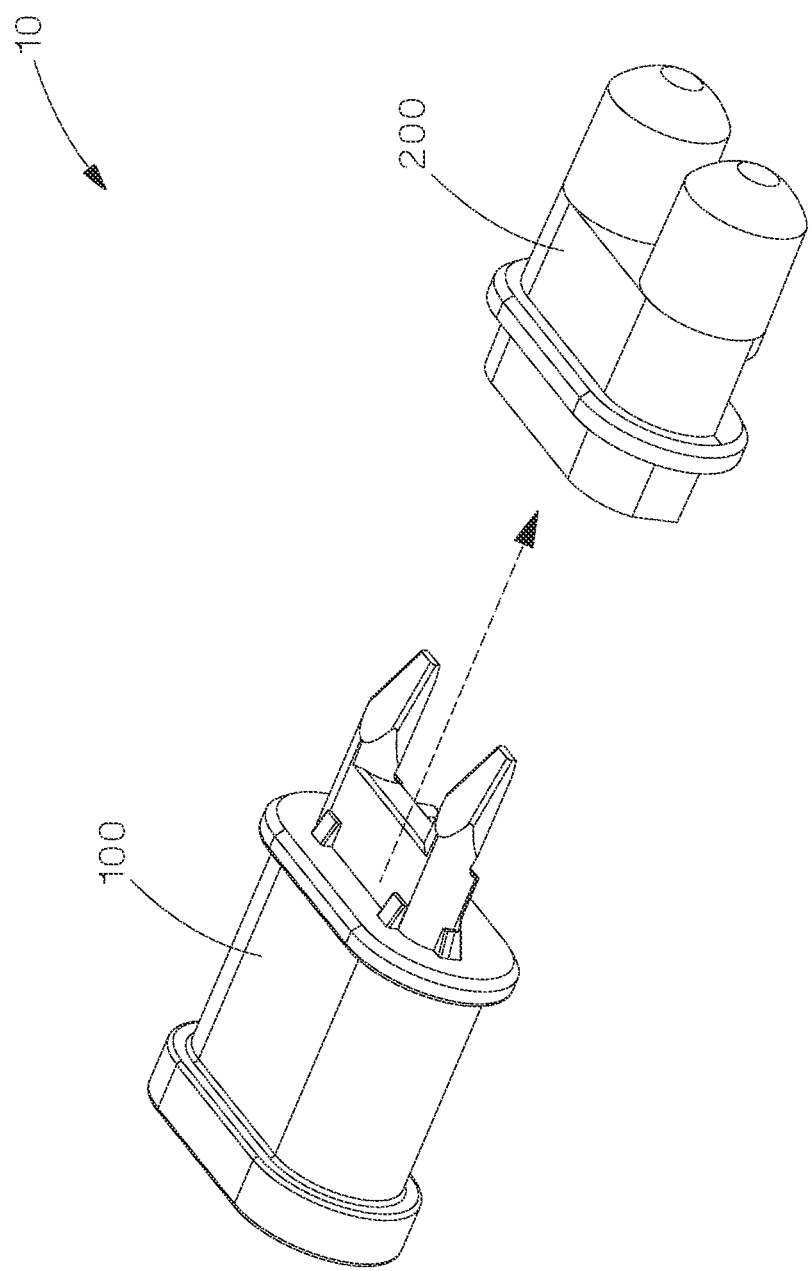
FIG. 4 shows the assembly direction of the fiber side component of the MOST optical fiber connector into the lens side component.

FIG. 4. shows the assembly process of inserting the fiber side component 100 of the MOST optical fiber connector 10 into the lens side of the connector 200.

As shown in FIG. 5, in order to fully assemble the two components, eight small wedge-like features 150, or stops, are used to align the fiber side of the connector inside of the lens side of the connector. The angle on the eight wedges 150 matches that of the geometry on the mating component allowing for the precise alignment and location of the fiber side of the connector in the lens side of the connector. These stops also act as ideal bonding locations as both halves of the connector are in contact with each other. A detailed description of the bonding locations for the two connector components can be seen in FIG. 5.

Figure 6:
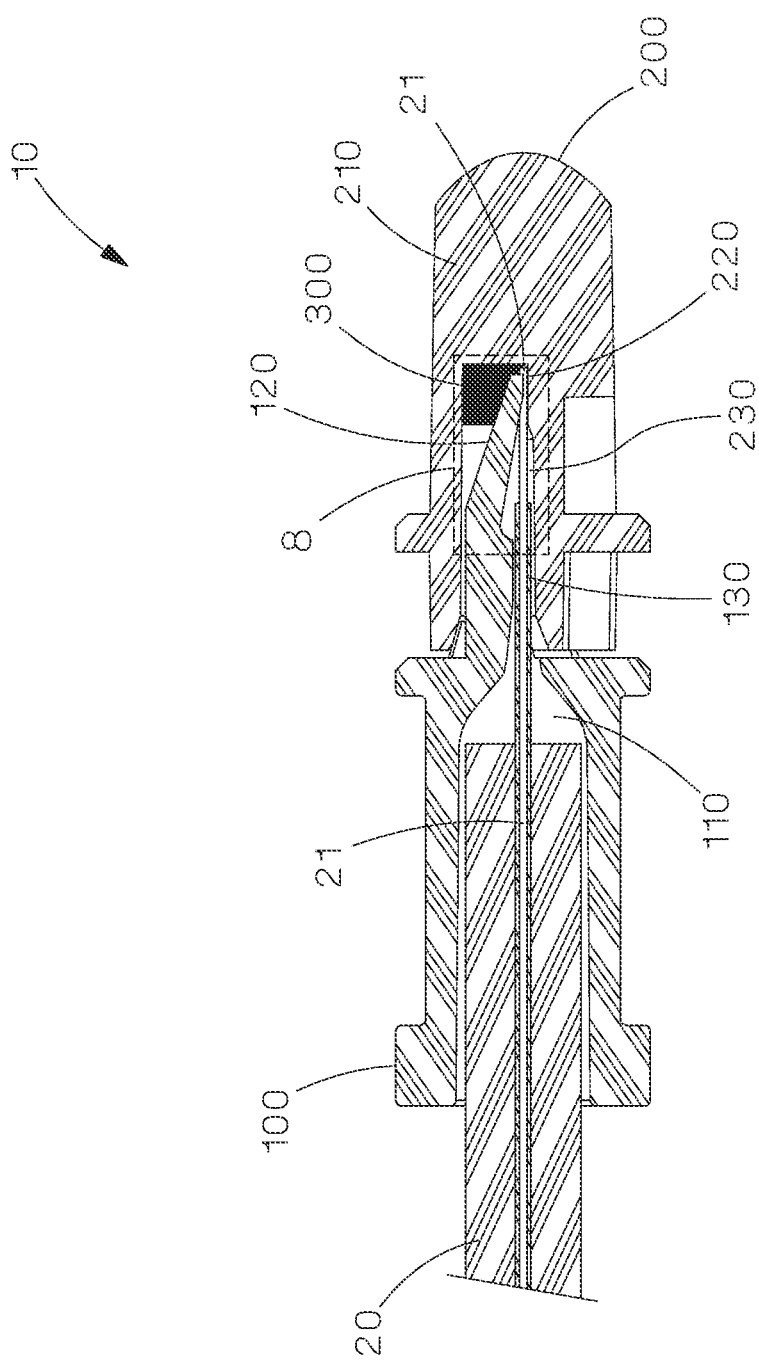
FIG. 6 is a side cross-sectional view of the MOST optical fiber connector of FIG. 1.
Figure 7:
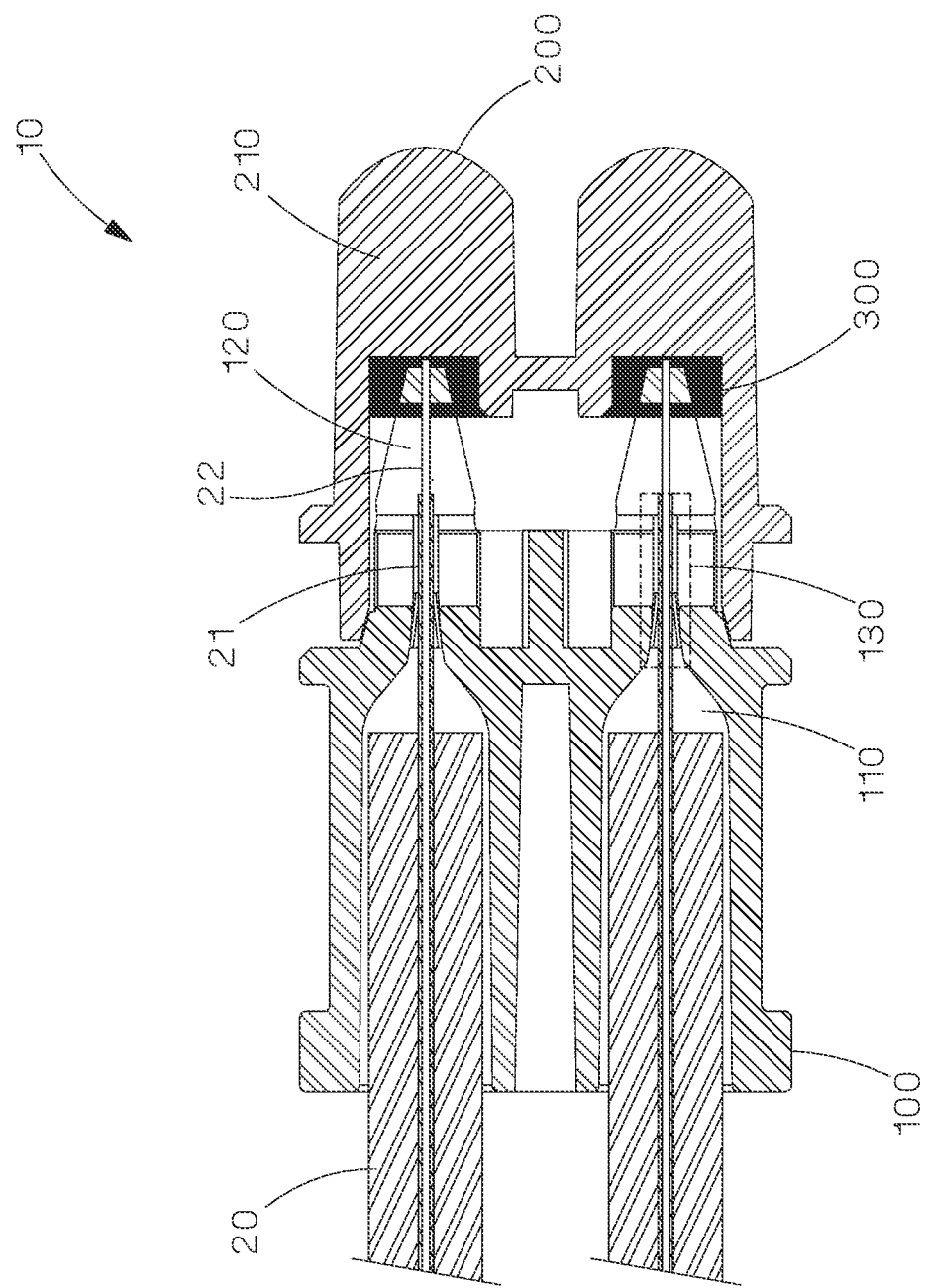
FIG. 7 is a bottom cross-sectional view of the MOST optical fiber connector of FIG. 1.
Figure 8:
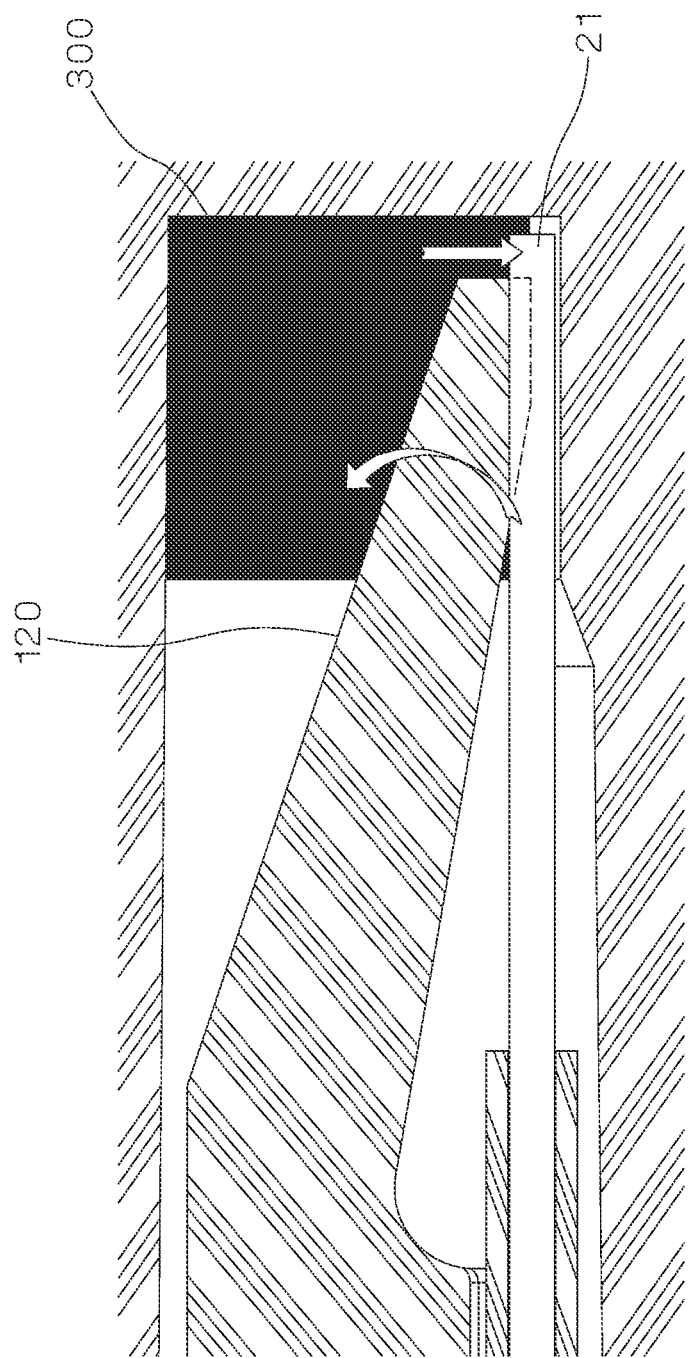
FIG. 8. is a side cross-sectional view showing the fiber retention features direction of rotation as the bare fiber is being inserted.

Once the two components are assembled, the MOST optical fiber connector 10 can accept and terminate a stripped fiberoptic cable 20 with the following steps as seen in FIG. 6. and FIG. 7:

1. A fiberoptic cable 20 can be inserted into the fiber optic cable retention pocket 110 where the bare fiber 22 and acrylate coated sections of the fiber 21 then pass through the opening leading into the fiber guide channel 130 and large V-groove 230. This fiber guide channel 130 and large V-groove 230 align the acrylate coated portion of the fiber 21 to ensure that the bare fiber can 22 be accepted by the small V-groove 220.
2. As the bare fiber 22 is being pushed into the small V-groove 220, the bare fiber flexible retention feature 120 deflects upward while also applying a positive retention force on the top of the bare fiber 22 to seat the bare fiber 22 in the small V-groove 220 as seen in FIG. 8. During insertion the bare fiber 22 must also pass through a pocket of index matching gel/UV epoxy 300 which will be described in detail later. Securing the bare fiber 22 in the small V-groove 220 guarantees precise axial alignment between the fiber 22 and the lens 210.

FIG. 8. Shows the fiber retention features' 110 direction of rotation as the bare fiber 22 is being inserted and also shows the retention force of the fiber retention feature 110 on the bare fiber 22.

Two types of V-grooves 220,230 with varying functions are used in the MOST optical fiber connector 10. FIG. 9. shows both types of V-grooves as described below:

1. The large V-groove 230 is used only as a loose guide along with the fiber guide channel 130 to contain the acrylate coated fiber 21 as it is being inserted. It is not designed to precisely align the fiber to any portion of the connector but only to loosely retain and guide the fiber inside of the cavity.
2. The small V-groove 220 is used to provide precise axial alignment between the bare fiber 22 and the lens 210. The flexible retention feature applies positive force on the bare fiber 22 locking it into the small V-groove as even small axial misalignment between the fiber and lens can cause optical distortion.

After the fiber is fully inserted within the MOST optical fiber connector 10, the cable jacket 23 and bare fiber 22 need to be bonded to the connector 10.

Figure 10:
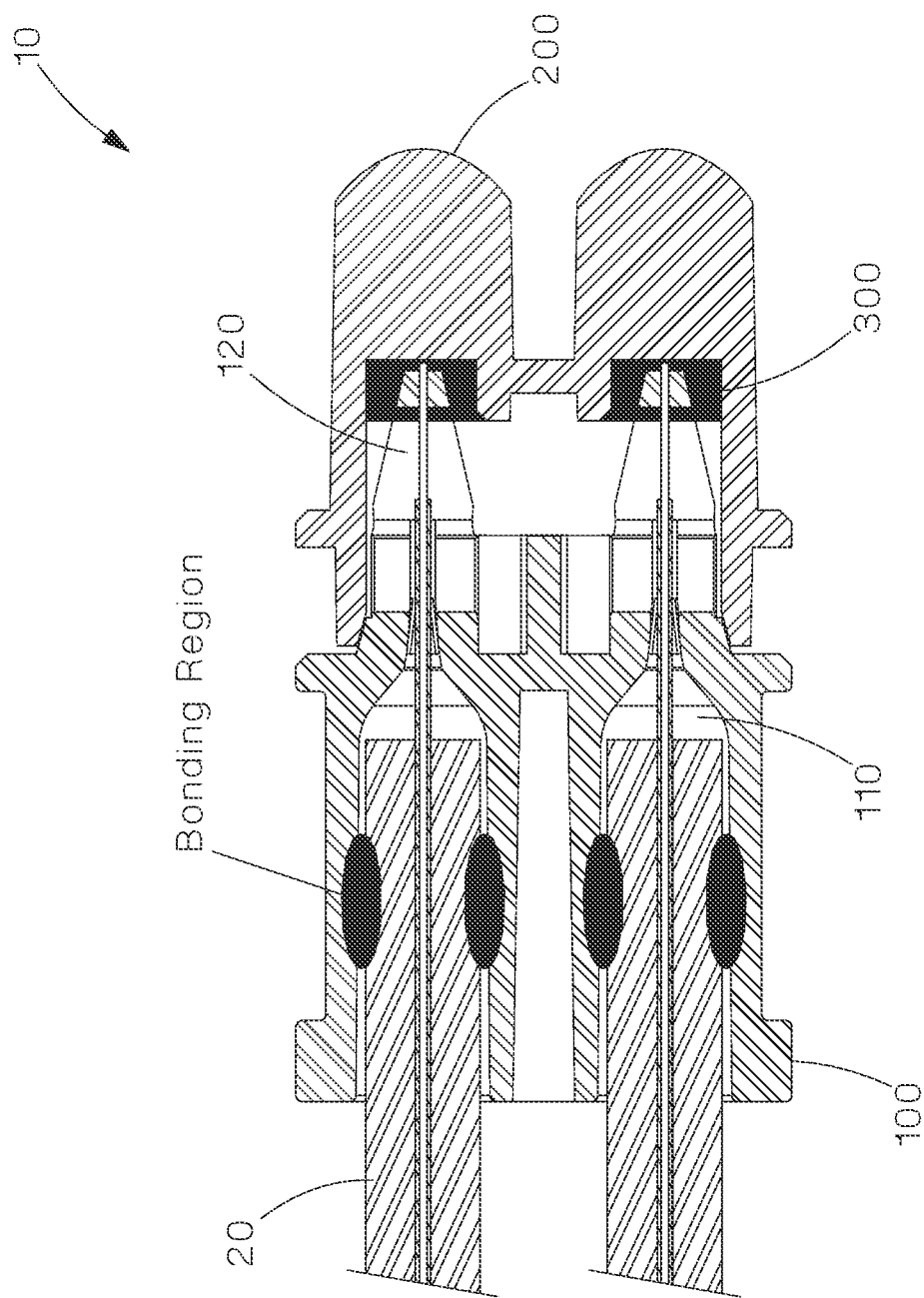
FIG. 10 shows bonding locations for the cable jacket to the connector and the location of the index matching gel/UV epoxy.

The cable jacket 23 can be bonded using a similar welding operation or epoxy as described earlier for joining the two connector components 100,200. The weld between the cable jacket 23 and MOST optical fiber connector 10 will act as a strain relief to ensure that the stripped fiber sections are not damaged during handling. See FIG. 10. for details.

The bare fiber 22 will be bonded to the MOST optical fiber connector 10 using the index matching gel/UV epoxy 300 mentioned earlier. With the bare fiber 22 seated in the small V-groove 220, the index matching gel/UV epoxy 300 will be cured to lock the tip of the bare fiber 22 in place ensuring that it cannot move laterally or axially within the connector 10 during use. The index matching gel 300 also reduces the potential for optical loss by bridging any gaps that may exist between the bare fiber face and the lens after insertion. See FIG. 10 for details.

FIG. 11 shows an alternate embodiment of a MOST optical fiber connector 12 connector can also be designed so that it assembles from one top half component 102 and one bottom half component 202 as opposed to front (lens side) and back (fiber side) half components. In this orientation all of the internal features would remain the same. The only differences in this design, compared to the one shown above, would be the bonding locations for assembly and the components assembly direction. FIG. 11. shows the assembled top and bottom components as well as the assembly direction.

The embodiment of the present invention in a form factor similar to the traditional MOST connector used in the automotive industry for 1 mm step-index plastic optical fiber is disclosed. However, it is understood that the form factor can be modified by anyone skilled in the art. The passive alignment feature that positions the fiber to the focal point of the lens is not restricted to any specific embodiment.

The invention claimed is:

1. An optical fiber connector comprising:
a lens component, the lens component having at least one lens and an opening with at least one V-groove therein wherein the at least one lens is associated with the at least one V-groove;
a fiber component, the fiber component being configured to be partially inserted into the lens component and having at least one bare fiber flexible retention feature configured to retain a fiber of a fiber optic cable within the at least one V-groove and align the fiber with the lens; and
a wedge feature used to align the fiber component and the lens component when they are secured together.

2. The optical fiber connector of claim 1 wherein the at least one V-groove includes an at least one large V-groove portion and an at least one small V-groove portion wherein the at least one large V-groove portion is configured to interact with an at least one fiber guide channel on the fiber component to align a fiber into the at least one small V-groove which is in turn configured to interact with the at least one bare fiber flexible retention feature to precisely align a bare portion of the fiber with a lens of the lens component.

3. The optical fiber connector of claim 1 further comprising a section of index matching gel/epoxy located within the lens component near a lens, the index matching gel/epoxy being configured to lock the tip of the bare fiber in place when the index matching gel/epoxy has been cured.

* * * * *